July 24, 1962

C. A. DOMENICALI 3,046,164

METAL PURIFICATION PROCEDURES

Filed Oct. 18, 1955

INVENTOR.
CHARLES A. DOMENICALI

BY *Orvin M. Haugen*

ATTORNEY 3,046,164
METAL PURIFICATION PROCEDURES

Charles A. Domenicali, Hopkins, Minn., assignor to Minneapolis-Honeywell Regulator Company, Minneapolis, Minn., a corporation of Delaware
Filed Oct. 18, 1955, Ser. No. 541,183
11 Claims. (Cl. 148—1.6)

The present invention relates to the electrical purification of metallic substances wherein the metal substance has a thermoelectric Peltier coefficient for an electrical current passing between the solid phase and the molten phase respectively, and a coefficient of opposite sign for a current passing from the molten phase to the solid phase. More specifically, the present invention relates to the purification of metallic bodies by means of taking advantage of the Peltier effect in metals, wherein a thermoelectric effect is obtained between the molten and solid phases of the metal substance, that is, the passage of the current tends to create heating in one portion and cooling in another portion as the current passes from one phase to another. Thus, a molten zone may be caused to move along a metallic body by means of passing a substantially continuous current of a certain magnitude through the body into which or adjacent to which there has previously been formed a molten zone or area. This procedure is useful in connection with metals as well as semiconductor substances; hence, throughout this specification, the term "metal" shall be taken to include metallic and semiconductor materials.

It is a well-known phenomenon that impurities in a metallic body generally prefer to remain in the molten portion of the substance. Therefore, by taking advantage of this tendency on the part of metallic or the like substances, one may purify a body by means of successively moving a molten zone or solid-liquid interface from one end of the body to another, thereby causing the impurities to migrate toward the end of the body which is last to solidify. Such a procedure is commonly known in the art today as zone refining. Of course, impurities which prefer the solid phase when in equilibrium with the molten phase may be successfully dealt with in zone refining methods. Accordingly, these present procedures utilize an elongated crucible or boat, and one or more induction coils or other heating elements which are preferably of a length less than that of the boat in order that the molten zone may be moved slowly from one end of the crucible to the other. In this connection, the metal to be purified may be held stationary and the melting means such as an induction coil or the like is moved relative to the body, or vice versa. Unfortunately, each of these methods requires rather elaborate and expensive equipment and further, normally requires the constant attention of a skilled operator.

According to the present invention, a molten zone may be formed in a metallic body and caused to migrate along the length thereof according to the Peltier effect, whereby heat may be generated from an electrical current passing, for example, from the solid phase into the liquid phase of the metal and likewise a cooling effect of substantially equal and opposite magnitude may be set up where the current passes from the molten phase into the solid phase. Of course, for some materials this phenomenon may be of opposite sign whereby cooling is accomplished from a current passing from the solid phase into the molten phase, and heat generated from a current passing from the molten phase into the solid phase. Once the signs of these coefficients have been determined, it is possible in any case to move the molten zone in the desired direction. Briefly, the process consists of first the formation of an incremental molten zone in an elongated metallic body and thence the commencement of a current flow which is of sufficient magnitude to generate a heating effect at one solid-liquid interface, and also provide a cooling effect at the other solid-liquid interface. The energy thus provided is sufficient to cause the zone to migrate along the length of the body. An upper limit on the magnitude of current which can be utilized is governed by the Joule heat generated in accordance with the $I^2R$ losses in the material and at the liquid-solid interface. In other words, if one passes a sufficient magnitude of electrical current through a body, the Joule heat will prevail and cause general melting in the liquid-solid interfaces and perhaps over the entire body. If the melting point of the material to be purified is sufficiently high, it may be necessary to provide auxiliary heating means in order to minimize the thermal energy losses which are caused by conduction of heat away from the hot portion of the metal body to a relatively cooler portion of the body. Proper temperatures and the like may be readily determined in each individual case.

The present invention has particular use in the semiconductor field where metallic substances of extremely high purity having relatively high melting points are required. The difficulties of obtaining highly purified metals increases as the melting point of the substances increase and silicon, for example, which melts at approximately 1420° C. is extremely difficult to purify. Contamination from crucibles, boats or other sources is difficult to control. According to the present invention no crucible or the like is necessary for supporting the body during purification since the surface tension of the material is sufficient to maintain the molten zone intact. Since the molten zone in the present procedure is a thin layer between two solid sections of the material being crystallized there is normally no difficulty encountered because the surface tension is adequate to support the thin layer which is the molten zone.

Accordingly, it is an object of the present invention to provide an improved process for purification of metallic substances which operates on the basis of the Peltier effect in metals.

It is a further object of the present invention to provide an improved procedure for purification of metallic substances which does not require a crucible or boat to retain the metallic substance while undergoing purification.

It is also an object of the present invention to provide a purification process for metallic substances whereby thermoelectric properties of the metal are utilized to move a molten zone along a rod or body.

It is still a further object of the present invention to provide an electrical refining method for metallic substances which requires essentially no mechanically moving parts during the purifying cycle.

Other and further objects will become apparent upon a further study of the specification and claims and with reference to the accompanying drawings in which:

Figures 1, 2:
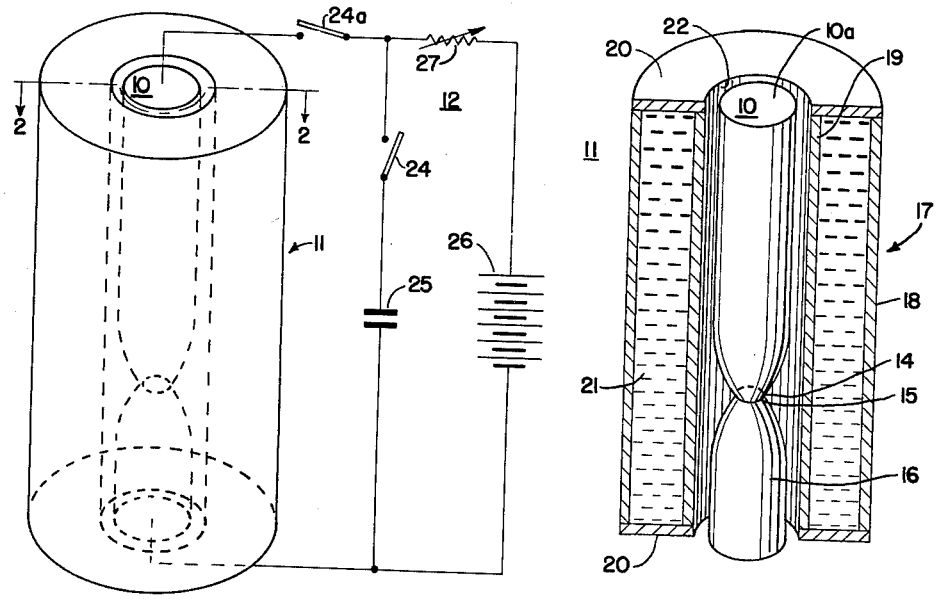
FIGURE 1 is a perspective view of a preferred modification of the apparatus used in accomplishing the present invention showing schematically the electrical operating circuit.
FIGURE 2 is a vertical sectional view taken along the lines and in the direction of the arrows 2—2 of FIGURE 1.

According to the preferred modification of the present invention, an elongated metallic rod 10 which is to be purified is placed within the cylindrical heating chamber 11 and electrically connected into the schematically illustrated electrical circuit 12. The rod 10 includes a constricted zone 14 which terminates in a point 15 and makes contact with a second similar contact rod or the like 16.

The cylindrical heating oven 11 includes an annular ceramic cylindrical shell 17 having an outer shell 18, inner shell 19 and end plates 20. The annular chamber 21 may be filled with a substance which melts in the range of the melting point of the rod 10. Ideally, the chamber 21 may be filled with a metallic substance which has a melting point substantially equal to that of the material undergoing purification. The inner annular zone 22 provides a chamber for receiving the rod 10 and protects it from radiant losses or gains from the environment which tend to render the system unstable during operation. If desired, a seed crystal may be included in the zone 14 in order to provide a finished bar with proper crystalline orientation.

In operation, rods 10 and 16 are held supported in place by any suitable clamping or holding devices (not shown). With the rods 10 and 16 secured in place, condenser 25 is charged by closing switch 24, the switch 24A is closed and a surge of electrical energy is pushed through the rods from the capacitor 25, and this initial surge is followed by a steady state flow of energy of somewhat lower magnitude from the battery 26. The steady state flow is regulated by variable resistor 27. The switch 24 may be opened after the initial surge of energy has been taken from capacitor 25. The constriction at 14 provides a zone where electrical resistance is relatively higher than at other regions along the rod. The initial surge of energy is of sufficient magnitude to melt a small zone of material in the constriction region 14 and 15, and the steady state flow is of sufficiently high energy level to maintain the zone molten. The Peltier effect in the material, of course, causes the thus formed zone to migrate away from the constriction 14 along the rod 10.

Figure 3:
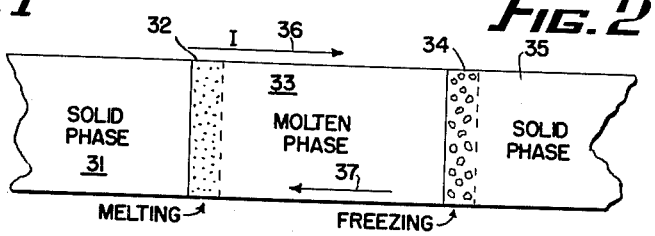
FIGURE 3 is a schematic view showing the principle of operation of the present invention.
Figure 4:
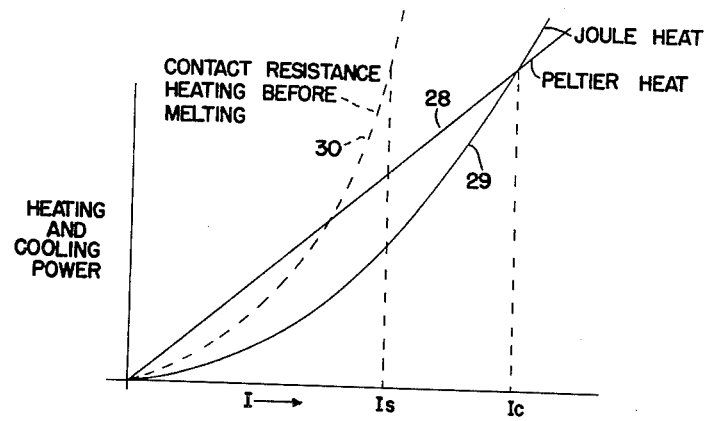
FIGURE 4 is a graph plotting the heating and cooling effect of power versus current, illustrating the relative effects of Joule heat and Peltier heat for a typical substance.

Reference is made to FIGURES 3 and 4 of the drawings wherein there is shown schematically and graphically the theoretical aspects of the present invention. While the rods 10 and 16 are placed in contact at 15, the Joule heating at the contact resistance in this situation is shown by the dotted line 30 on FIGURE 4. It is noted that at a starting current value of $I_s$ the contact resistance is adequate to cause some melting to occur at the point of contact. Thus, when the capacitor 25 discharges its energy across the rods 10 and 16, the initial surge of current is rather high and melting occurs at the point of contact after which the Joule heating at the contact resistance immediately drops to the values as is shown in the solid line designated 29. In this connection, a steady flow of current may be passed through the rod which lies somewhere below the value $I_c$ which designates the critical value of the system wherein currents of a greater magnitude will cause melting to occur due to the Joule heat prevailing. At currents in excess of $I_c$, the Joule heat predominates, while at current levels below $I_c$, the cooling of the Peltier effect predominates. The magnitude of the energy required to continue the molten zone migrating is determined chiefly by the amount of thermal conductivity losses from the molten region. Since the entire rod has been heated to a temperature which is slightly below that required for melting the material these conductivity losses will be relatively small.

Reference is made to FIGURE 3 of the drawings wherein the steady state running of the system is illustrated. In this connection, a solid zone 31 is situated in advance of a heating interface 32 which is in turn on the leading edge of a molten zone 33. A freezing interface 34 is situated at the trailing end of the molten zone 33 and becomes the solid zone 35. The heating interface 32 results from the thermoelectric coefficient existing between a solid zone such as 31 and a molten zone such as 33. Thus, a current I traveling along the rod in the direction of the arrow 36 will cause a certain amount of heating to occur at the interface between the solid phase in zone 31 and the molten phase included in zone 33 as represented by 32. Similarly, there is a thermoelectric coefficient between the molten phase 33 and a solid phase 35 for a current I traveling in the direction of the arrow 36. This causes a cooling effect to occur and sets up a freezing interface 34 between the molten zone and the liquid zone. Thus, in steady state operation the molten zone 33 is caused to migrate in the direction of the arrow 37 along the length of the rod or as far as is desired. Due to the tendency for various impurities included in the rod 10, to remain in the molten phase as is evidenced by the segregation constants for impurities between the liquid phase and solid phase, the zones of the rod 10 through which the molten phase has passed will be more highly purified due to the removal of impurities to a portion which is closer to the terminal or end portion 10a of the rod 10. Of course, it will be appreciated that for a metal having opposite thermoelectric coefficients from that given in the example of FIGURE 3, the current must be passed through the body in a direction opposite to that shown by the arrow 36 in order to cause the molten zone to migrate in the direction shown by the arrow 37.

*Example A*

Accordingly, it is possible to pass a molten zone along a rod of germanium semiconductor material in order to remove impurities from the portions through which the zone has passed. In this connection, a germanium rod having a diameter of about 5 millimeters was necked down to a constricted terminal portion having a diameter of about 2 millimeters. The crystal was mounted in a horizontally disposed heated tube and was maintained in an inert helium atmosphere. The treating tube was heated and maintained at an elevated temperature until the crystal or rod was heated to a temperature of about 900° C. A current of about 5 amperes was then passed through the crystal, this amount of current being adequate to move the melting zone in one direction at a rate of about 0.01 mm./sec. The portions through which the molten zone migrated must thus have been purified to the extent that the impurities originally present in the rod tended to remain in the molten phase of the system.

*Example B*

In a similar manner bismuth may be purified. In this connection, the bismuth was in the form of a rod having a diameter of about 6 mm. and about 100 mm. long, and was necked down to a constricted terminal portion having a diameter of about 2 mm. The bismuth rod was maintained in an inert atmosphere and in a vertically disposed position while a current of about 10 amp. was passed through the rod after a sufficient surge of energy had been applied to the system to cause a small molten zone to occur at the junction between the constricted zone and a starting rod. The molten zone migrated at a visible rate and impurities present in the impure rod must thus have been transferred to a terminal portion of the rod thereby purifying the remainder of the rod through which the molten zone had passed.

Although various specific modifications of the invention have been disclosed herein, it will be understood that these are for purposes of illustration only and there is therefore no intent to limit the scope of the invention otherwise than is shown by the appended claims.

I claim:

1. The method of purifying a metallic body consisting essentially of a substance having a thermoelectric coefficient of one sign for an electrical current passing between the solid phase and the molten phase respectively and a like coefficient of opposite sign for a current passing from the molten phase to the solid phase, said method including fusing a portion of said body to establish an incremental molten zone in said body and moving said incremental molten zone along the length of said body through the Peltier thermoelectric influence of a unidirectional electrical current moving through said body, said current being of a magnitude below that required to fuse said body due to Joule heat, the portion of said body adjacent to said incremental zone being heated to and maintained at a temperature which is just below the fusion point thereof during purification.

2. The method of purifying a body taken from the class consisting of germanium and silicon, said method including fusing portion of said body to establish an incremental molten zone in said body and moving said incremental molten zone along the length of said body through the Peltier thermoelectric influence of a unidirectional electrical current moving through said body, said current being of a magnitude below that required to fuse said body due to Joule heat, the portion of said body adjacent to said incremental zone being heated to and maintained at a temperature which is just below the fusion point thereof during purification.

3. The method of purifying a metallic body consisting essentially of a substance having a thermoelectric coefficient of one sign for an electrical current passing between the solid phase and the molten phase respectively and a like coefficient of opposite sign for a current passing from the molten phase to the solid phase and having a rod-like configuration, said method including the steps of heating said rod to a temperature slightly below the melting point of said body, fusing a segment of said body to provide an incremental molten zone therein, and thence moving said incremental molten zone along the length of said body through the thermoelectric influence of a unidirectional electrical current moving through said body, said current being of a magnitude which is less than that required to fuse said body due to Joule heat, the portion of said body adjacent to said incremental zone being heated to and maintained at a temperature which is just below the fusion point thereof during purification.

4. The method of purifying a portion of an elongated metallic body having a thermoelectric coefficient of one sign for an electrical current passing between the solid phase and the molten phase, and a coefficient of opposite sign for a current passing from a molten phase to a solid phase respectively, said method comprising forming a molten zone in said body and passing a substantially unidirectional electrical current therethrough, said current being of sufficient magnitude to cause said zone to move along the length of said elongated body, but of a magnitude less than that required to fuse said body by the effect of Joule heat.

5. The method of purifying a portion of an elongated body taken from the class consisting of germanium and silicon, and which comprises forming an incremental molten zone within a portion of said body and passing a substantially unidirectional electrical current therethrough, said current being of sufficient magnitude to cause said zone to move along the length of said elongated body, but of a magnitude less than that required to fuse said body by the effect of Joule heat.

6. The method of purifying a portion of an elongated body of metallic substance having a terminal portion of relatively narrow cross-sectional area, said metallic substance having a thermoelectric coefficient of one sign for an electrical current passing between the solid phase and the molten phase respectively and a like coefficient of opposite sign for a current passing from the molten phase to the solid phase, said method including fusing a segment of said body at said terminal portion across a transverse section thereof, thence passing a substantially unidirectional electrical current therethrough, said current being of sufficient energy level to cause said fused zone to move along the length of said elongated body due to the effect of Peltier heat, but which is below the energy level required for fusing due to Joule heat.

7. The method of purifying a portion of an elongated body of metallic substance having a terminal portion of relatively narrow cross-sectional area, said metallic substance having a thermoelectric coefficient of one sign for an electrical current passing between the solid phase and the molten phase respectively and a like coefficient of opposite sign for a current passing from the molten phase to the solid phase, said method including fusing a segment of said body at said narrow terminal portion, thence passing a substantially unidirectional electrical current therethrough, said current being of sufficient energy level to cause said fused zone to move along the length of said elongated body due to the effect of Peltier heat, but which is below the energy level required for fusing due to Joule heat.

8. The method of purifying a portion of an elongated body of metallic substance having a terminal portion of relatively narrow cross-sectional area, said metallic substance having a thermoelectric coefficient of one sign for an electrical current passing between the solid phase and the molten phase respectively and a like coefficient of opposite sign for a current passing from the molten phase to the solid phase, said method including fusing a segment of said body at said narrow terminal portion by means of a surge of electrical energy of magnitude sufficient to melt said terminal portion by the effect of Joule heat, thence passing a substantially steady unidirectional electrical current therethrough of sufficient energy level to cause said fused zone to move along the length of said elongated body due to the effect of Peltier heat, but below the energy level required for fusing the body due to Joule heat.

9. The method of purifying a portion of an elongated body taken from the class consisting of silicon and germanium having a terminal portion of relatively narrow cross-sectional area, said method including fusing a segment of said body at said terminal portion across a transverse section thereof, thence passing a substantially unidirectional electrical current therethrough, said current being of sufficient energy level to cause said fused zone to move along the length of said elongated body due to the effect of Peltier heat, but which is below the energy level required for fusing due to Joule heat.

10. The method of purifying a portion of an elongated metallic body having a thermoelectric coefficient of one sign for an electrical current passing between the solid phase and the molten phase respectively, and a coefficient of opposite sign for a current passing from a molten phase to a solid phase, said method comprising heating said body to a temperature approaching the melting temperature of said body, forming a molten zone in a portion of said body, and thence passing a substantially unidirectional electrical current therethrough, said current being of a magnitude sufficient to cause said zone to move along the length of said elongated body by the effect of Peltier heating and cooling but of a magnitude less than that required to fuse said body by the effect of Joule heat.

11. The method of thermoelectrically purifying a portion of an elongated metallic body and orienting the crystalline structure thereof, said metal having a thermoelectric coefficient of one sign for an electrical current passing between the solid phase and the molten phase respectively, and a coefficient of opposite sign for a current passing from a molten phase to a solid phase, said method comprising placing a seed crystal adjacent and in electrical contact with an end of said body, placing said body in an environment having a temperature approaching the melting temperature of said body, forming a molten zone in said body adjacent said seed crystal, and passing a substantially unidirectional electrical current through said seed crystal and said body, said current being of sufficient magnitude to cause said zone to move along the length of said elongated body, but of a magnitude less than that required to fuse said body by the effect of Joule heat.

References Cited in the file of this patent

UNITED STATES PATENTS

| | | |
|---|---|---|
| 2,711,379 | Rothstein | June 21, 1955 |
| 2,719,799 | Christian | Oct. 4, 1955 |
| 2,739,088 | Pfann | Mar. 20, 1956 |
| 2,743,199 | Hull et al. | Apr. 24, 1956 |
| 2,792,317 | Davis | May 14, 1957 |